US005827447A

United States Patent [19]

Tamura et al.

[11] Patent Number: 5,827,447

[45] Date of Patent: Oct. 27, 1998

[54] LIQUID BLEACHING AGENT COMPOSITION

[75] Inventors: Yoshinori Tamura; Hiroyuki Yamada; Muneo Aoyagi, all of Tochigi, Japan

[73] Assignee: Kao Corporation, Tokyo, Japan

[21] Appl. No.: 433,408

[22] PCT Filed: Nov. 18, 1992

[86] PCT No.: PCT/JP92/01508

§ 371 Date: May 18, 1995

§ 102(e) Date: May 18, 1995

[87] PCT Pub. No.: WO94/11484

PCT Pub. Date: May 26, 1994

[30] Foreign Application Priority Data

May 15, 1991 [JP] Japan .................................... 3-110273
Aug. 4, 1992 [JP] Japan .................................... 4-208168

[51] Int. Cl.[6] ................................ C09K 3/00; C11D 3/39

[52] U.S. Cl. ................................ 252/186.38; 252/186.39; 252/186.28; 510/312

[58] Field of Search ......................... 252/186.38, 186.39, 252/186.28; 510/312

[56] References Cited

U.S. PATENT DOCUMENTS

| | | | |
|---|---|---|---|
| 3,852,210 | 12/1974 | Krezanoski | 252/95 |
| 4,496,473 | 1/1985 | Sanderson | 252/186.41 |
| 4,525,291 | 6/1985 | Smith et al. | 252/95 |
| 4,772,290 | 9/1988 | Mitchell et al. | 8/107 |
| 5,141,664 | 8/1992 | Corring et al. | 252/90 |
| 5,158,700 | 10/1992 | Sotoya et al. | 252/186.38 |
| 5,160,655 | 11/1992 | Donker et al. | 252/95 |
| 5,405,413 | 4/1995 | Willey et al. | 8/111 |
| 5,419,847 | 5/1995 | Showell et al. | 252/100 |

FOREIGN PATENT DOCUMENTS

| | | |
|---|---|---|
| 2-170898 | 7/1990 | Japan . |
| 2-212599 | 8/1990 | Japan . |
| 3-021700 | 1/1991 | Japan . |

OTHER PUBLICATIONS

JP–A–04 337 339 (Kao) Japanese Patent Abstract, 25 Nov. 1992.

JP–A–04 337 398 (Kao) Japanese Patent Abstract 25 Nov. 1992.

*Primary Examiner*—Joseph D. Anthony
*Attorney, Agent, or Firm*—Birch, Stewart, Kolasch & Birch, LLP

[57] ABSTRACT

A transparent liquid bleaching agent composition having a transparent appearance and excellent storage stability and bleaching power, characterized by comprising hydrogen peroxide (a), a surfactant (b) and a bleach activator (c) capable of yielding an organic peracid when reacted with hydrogen peroxide and having a parameter β of a mixed system consisting of the surfactant (b) and the bleach activator (c) as calculated according to the following equation of smaller than −2:

$$\beta = \frac{In[\alpha_1 C^*/(x_1 C_1)]}{(1-x_1)^2} = \frac{In[\alpha_2 C^*/(x_2 C_2)]}{(1-x_2)^2}$$

wherein $C_1$: the critical micelle concentration of the surfactant;

$C_2$: the critical micelle concentration of the bleach activator;

$\alpha_1$: the molar fraction of the surfactant in the whole mixed solute (molar fraction of added surfactant);

$\alpha_2$: the molar fraction of the bleach activator in the whole mixed solute (molar fraction of added activator);

$C^*$: the critical micelle concentration of the $X_1$: the molar fraction of the surfactant in the mixed micelle; and $X_2$: the molar fraction of the bleach activator in the mixed micelle.

19 Claims, No Drawings

LIQUID BLEACHING AGENT COMPOSITION

This application is a 371 of PCT/JP92/0150S Nov. 18, 1992.

1. Field of the Invention

The present invention relates to a liquid bleaching agent composition, more particularly to a liquid bleaching agent composition having not only an excellent storage stability but also a good bleaching power.

2. Description of the Related Art

Bleaching agent is chemically classified into chlorine-base bleaching agent and oxygen-base bleaching agent. Further, it is physically classified into solid (powdery) bleaching agent and liquid bleaching agent.

The chlorine-base bleaching agent is limited in the kind of fibers to which it can be applied, cannot be used for colored or patterned fabrics, and has a peculiar odor. For this reason, in recent years, an oxygen-base bleaching agent free from these drawbacks has come to widely spread in the art.

Sodium percarbonate and sodium perborate are particularly utilized as the solid oxygen-base bleaching agent from the viewpoint of bleaching performance, stability, etc. A liquid oxygen-base bleaching agent wherein use is made of hydrogen peroxide has also considerably spread by virtue of its handleability.

Since the bleaching power of the oxygen-base bleaching agent is lower than that of the chlorine-base bleaching agent, a bleaching agent composition comprising a combination of the oxygen-base bleaching agent with various bleach activators are utilized in the art. Examples of the activator include nitrites represented by acetonitrile, 0-acetylated compounds represented by glucose pentaacetate (GPAC), N-acylated compounds represented by tetraacetylethylenediamine (TAED) and acid anhydrides represented by maleic anhydride.

As a result of the studies conducted by the present inventors, it has been found that compounds capable of reacting with hydrogen peroxide to yield an organic peracid having a quaternary ammonium group, such as those described in U.S. Pat. Nos. 4,933,103 (assignee: Kao Corp., date of grant: Jun. 12, 1990), 5,059,344 (assignee: Kao Corp., date of grant: Oct. 22, 1991), 4,915,863 (assignee: Kao Corp., date of grant: Apr. 10, 1990), 4,978,770 (assignee: Kao Corp., date of grant: Dec. 18, 1990) and the like are very excellent as the bleach activator. Further, examples of an organic peracid precursor having an anionic group are described in U.S. Pat. Nos. 4,412,934 (assignee: Procter & Gamble Co.; date of grant: Nov. 1, 1983), 4,681,592 (assignee: Procter & Gamble Co.; date of grant: Nov. 1, 1987) and the like.

When the bleaching agent composition comprises a mixture of solid substances, a good storage stability can generally be attained when the composition comprises a mixture of a solid peracid salt with the above-described solid bleach activator as a dried particle capable of yielding the above-described organic peracid. Neither any remarkable reaction nor a loss of the activity occurs until the composition is poured into water in a washing machine, etc., so far as they are maintained under dry condition during storage. However, when the composition is exposed to a highly humid environment, for example, in a bathroom, the dry bleaching agent (solid peracid salt) becomes humid, whereby its activity is lowered. When hydrogen peroxide which is liquid at an ordinary temperature is used as a peroxide source, it is impossible to provide a bleaching agent composition in a dried particle form.

Several proposals have been made on a liquid bleaching agent composition comprising hydrogen peroxide. U.S. Pat. No. 3,970,575 (assignee: Purex, date of grant: Jul. 20, 1976) discloses a bleaching agent composition comprising hydrogen peroxide which is stable under an acidic condition and is colored blue with a phthalocyanine pigment. U.S. Pat. No. 3,956,159 (assignee: Procter & Gamble Co.; date of grant: May 11, 1976) discloses a liquid bleaching agent composition comprising an organic peracid and its salt dissolved in an anhydrous organic ternary solvent (a three-component solvent). Further, U.S. Pat. No. 4,238,192 (assignee: Johnson & Johnson; date of grant: Dec. 9, 1980) discloses a liquid bleaching agent composition based on hydrogen peroxide. This composition contains an acid for adjusting the pH value thereof to 1.8 to 5.5 and a nitrogen compound (particularly an amino acid) for imparting a stability thereto. U.S. Pat. No. 4,130,501 (assignee: F.M.C. Corp.; date of grant: Dec. 19, 1978) discloses a stable, viscous, liquid bleaching agent composition comprising hydrogen peroxide which contains a surfactant and a thickener being added thereto. Besides these compositions, a detergent composition comprising an alkylphenolic nonionic surfactant, hydrogen peroxide and a stabilizer (phosphoric acid or the like), and an aqueous concentrate for bleaching having an excellent storage stability and a pH value of 10 or less and containing hydrogen peroxide, a nonionic Tenside and a specified amine oxide as a stabilizer are also known in the art. All of these inventions, however, are ones made for the purpose of stabilizing a liquid bleaching agent composition comprising hydrogen peroxide, and no consideration is given to an improvement in the bleaching power. Further, since no bleach activator is incorporated in all of them, the bleaching power cannot be said to be satisfactory.

Meanwhile, a liquid bleaching agent composition which utilizes a bleach activator capable of yielding an organic peracid is also known in the art. For example, U.S. Pat. No. 4,772,290 (assignee: Clorox, date of patent: Sep. 20, 1988) discloses a composition having an excellent storage stability and a low temperature activity and comprising an acidic aqueous solution containing hydrogen peroxide and a solid bleach activator dispersed therein. Since, however, this composition is not transparent and a bleach activator is dispersed therein, it has a drawback that the activator precipitates and separates during storage, so that the object of the use of the composition is remarkably spoiled. Further, this composition also has a drawback that no satisfactory bleaching power can be attained during use because the bleach activator is stored in an aqueous solution and therefore it gradually undergoes hydrolysis. Thus there has not been found any liquid bleaching agent composition which is transparent and excellent in storage stability and contains, dissolved therein, a bleach activator capable of yielding an organic peracid.

Accordingly, a transparent liquid oxygen-base bleaching agent composition having an improved storage stability and a higher bleaching power and containing a bleach activator dissolved therein is required in the art, and an object of the present invention is to provide such a liquid oxygen-base bleaching agent composition.

DISCLOSURE OF THE INVENTION

The present inventors have made extensive studies with a view to developing a liquid oxygen-base bleaching agent composition which is excellent in storage stability and transparent and has a higher bleaching power. As a result, they have found that the β value as an index for the magnitude of interaction between a surfactant and a bleach activator correlates to the storage stability. They have further studied from this point of view and, as a result, have found that when a bleach activator is combined with a surfactant in such a manner that the β value is smaller than −2, the bleach activator can be stabilized and homogeneously dissolved in a transparent state, so that it becomes possible to provide a transparent liquid oxygen-base bleaching agent composition wherein a bleach activator is in a remarkably stabilized state even in an aqueous hydrogen peroxide solution, which has led to the completion of the present invention.

Accordingly, the present invention provides a transparent liquid bleaching agent composition, characterized by comprising hydrogen peroxide (a), a surfactant (b) and a bleach activator (c) capable of yielding an organic peracid when reacted with hydrogen peroxide, and having a value of an interaction parameter, β, of a mixed system consisting of the surfactant (b) and the bleach activator (c) as calculated according to the following equation of smaller than −2:

$$\beta = \frac{In[\alpha_1 C^*/(x_1 C_1)]}{(1-x_1)^2} = \frac{In[\alpha_2 C^*/(x_2 C_2)]}{(1-x_2)^2}$$

wherein $C_1$: the critical micelle concentration of the surfactant;

$C_2$: the critical micelle concentration of the bleaching activator;

$\alpha_1$: the molar fraction of the surfactant in the whole mixed solute (molar fraction of added surfactant);

$\alpha_2$: the molar fraction of the bleach activator in the whole mixed solute (molar fraction of added activator);

$C^*$: the critical micelle concentration of the mixed system;

$X_1$: the molar fraction of the surfactant in the mixed micelle; and $X_2$: the molar fraction of the bleach activator in the mixed micelle.

The interaction parameter β used herein is defined in "Advances in Colloid and Interface Science", Vol. 26, pp. 111–129 (1986).

In the present invention, hydrogen peroxide (a) is incorporated in an amount of 0.3 to 30% by weight, preferably 0.5 to 10% by weight, particularly preferably 2 to 7% by weight, into the composition.

Although the surfactant (b) to be used in the present invention is not particularly limited, the composition of the present invention preferably contains at least one surfactant selected from the group consisting of nonionic surfactants, anionic surfactants and amphoteric surfactants, or at least one surfactant selected from the group consisting of nonionic surfactants and amphoteric surfactants.

Examples of the anionic surfactants to be used in the present invention include the following compounds.

(1) Salts of alkylbenzenesulfonic acids having a straight-chain or branched alkyl group, wherein the average number of carbon atoms of the alkyl group is 8 to 18.

(2) Salts of alkyl or alkenyl ether sulfuric acids having a straight-chain or branched alkyl or alkenyl group and, added thereto, ethylene oxide or propylene oxide or butylene oxide, or both of ethylene oxide and propylene oxide (molar ratio: 0.1/9.9 to 9.9/0.1), or both of ethylene oxide and butylene oxide (molar ratio: 0.1/9.9 to 9.9/0.1), wherein the average number of carbon atoms of the alkyl or alkenyl group is 8 to 20 and the average number of moles of added alkylene oxide per molecule is 0.5 to 8.

(3) Salts of alkyl- or alkenylsulfonic acids wherein the average number of carbon atoms of the alkyl or alkenyl group is 8 to 20.

(4) Salts of olefinsulfonic acids wherein the average number of carbon atoms is 10 to 20.

(5) Salts of alkanesulfonic acids wherein the average number of carbon atoms is 10 to 20.

(6) Salts of saturated or unsaturated fatty acids wherein the average number of carbon atoms is 10 to 24.

(7) Salts of alkyl or alkenyl ether carboxylic acids having, added thereto, ethylene oxide or propylene oxide or butylene oxide, or both of ethylene oxide and propylene oxide (molar ratio: 0.1/9.9 to 9.9/0.1) or both of ethylene oxide and butylene oxide (molar ratio: 0.1/9.9 to 9.9/0.1), wherein the average number of carbon atoms of the alkyl or alkenyl group is 10 to 20 and the average number of moles of added alkylene oxide per molecule is 0.5 to 8.

(8) Salts of a-sulfo fatty acids or esters of α-sulfo fatty acids represented by the following formula:

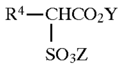

wherein Y represents an alkyl group having 1 to 3 carbon atoms or a counter ion, Z represents a counter ion and $R^4$ represents an alkyl or alkenyl group having 10 to 20 carbon atoms.

Examples of the counter ion of the anionic surfactant include ions of alkali metals such as sodium and potassium.

Examples of the nonionic surfactant to be used in the present invention include the following compounds.

(9) Polyoxyethylene alkyl or alkenyl ethers wherein the average number of carbon atoms of the alkyl or alkenyl group is 10 to 20 and the average number of moles of added ethylene oxide is 1 to 30.

(10) Polyoxyethylene alkylphenyl ethers wherein the average number of carbon atoms of the alkyl group is 6 to 12 and the average number of moles of added ethylene oxide is 1 to 25.

(11) Polyoxypropylene alkyl or alkenyl ethers wherein the average number of carbon atoms of the alkyl or alkenyl group is 10 to 20 and the average number of moles of added propylene oxide is 1 to 20.

(12) Polyoxybutylene alkyl or alkenyl ethers wherein the average number of carbon atoms of the alkyl or alkenyl group is 10 to 20 and the average number of moles of added butylene oxide is 1 to 20.

(13) Nonionic surfactants having an alkyl or alkenyl group and, added thereto, ethylene oxide and propylene oxide (molar ratio: 0.1/9.9 to 9.9/0.1) or ethylene oxide and butylene oxide (molar ratio: 0.1/9.9 to 9.9/0.1), wherein the average number of carbon atoms of the alkyl or alkenyl group is 10 to 20 and the average number of moles of added alkylene oxide per molecule is 1 to 30.

(14) Higher fatty acid alkanolamides or their alkylene oxide adducts represented by the following general formula:

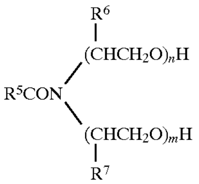

wherein $R^5$ represents an alkyl or alkenyl group having 10 to 20 carbon atoms, $R^6$ and $R^7$, which may be the same or different from each other, represent H or $CH_3$, n is an integer of 1 to 3 and m is an integer of 0 to 3.

(15) Sucrose/fatty acid esters wherein the average number of carbon atoms of the fatty acid moiety is 10 to 20.

(16) Fatty acid/glycerol esters wherein the average number of carbon atoms of the fatty acid moiety is 10 to 20.

(17) Amine oxides, for example, an alkyl- or alkenylamine oxide having a straight-chain or branched alkyl or alkenyl group having 1 to 24 carbon atoms, still preferably an alkylamine oxide represented by the following general formula (A):

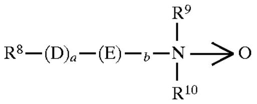

(A)

wherein $R^8$ represents an alkyl or alkenyl group having 8 to 24 carbon atoms, $R^9$ and $R^{10}$, which may be the same or different from each other, represent an alkyl group having 1 to 3 carbon atoms, D represents a

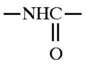 group or a

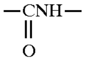 group,

E represents an alkylene group having 1 to 5 carbon atoms, and a and b are either both 0 or both 1.

In the above general formula (A), $R^8$ represents an alkyl or alkenyl group having 8 to 24 carbon atoms, particularly preferably an alkyl group having 12 to 18 carbon atoms. $R^9$ and $R^{10}$ represent an alkyl group having 1 to 3 carbon atoms, particularly preferably a group having one carbon atom, i.e., methyl group.

(18) A nonionic surfactant which is commercially available under the tradename of "Pluronic" and is produced by condensing ethylene oxide.

(19) Alkyl glycosides, for example, one represented by the following general formula:

$$R^{11}(OR^{12})_xG_y$$

wherein $R^{11}$ represents a straight-chain or branched alkyl, alkenyl or alkylphenyl group each having 8 to 18 carbon atoms in total, $R^{12}$ represents an alkylene group having 2 to 4 carbon atoms and G represents a residue derived from glucose.

A nonionic surfactant consisting of the alkyl glycoside(s) represented by the above general formula wherein x (average value) is 0 to 5 and y (average value) is 1 to 10 is preferable.

Examples of the amphoteric surfactant to be used in the present invention include a sulfobetaine and a carbobetaine each having a straight-chain or branched alkyl or alkenyl group having 1 to 22 carbon atoms. Still preferred examples of the amphoteric surfactant include sulfobetaines and carbobetaines represented by the following general formula (B):

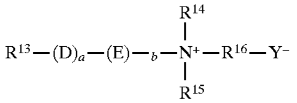

(B)

wherein $R^{13}$ represents an alkyl group having 8 to 22 carbon atoms, $R^{14}$ and $R^{15}$, which may be the same or different from each other, represent an alkyl group having 1 to 3 carbon atoms, $R^{16}$ represents an alkylene group having 1 to 5 carbon atoms which may have a hydroxyl group, D represents a

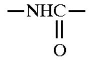 group or a

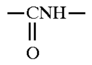 group,

E represents an alkylene group having 1 to 5 carbon atoms, a and b are either both 0 or both 1, and $Y^-$ represents $—SO_3^-$, $—OSO_3^-$, $—COO^-$ or $—OCOO^-$.

In the above general formula (B), $R^{13}$ represents an alkyl group having 8 to 22 carbon atoms, particularly preferably an alkyl group having 12 to 18 carbon atoms. $R^{14}$ and $R^{15}$ represent an alkyl group having 1 to 3 carbon atoms, particularly preferably a group having one carbon atom, i.e., methyl group. In the case of the sulfobetaine, $R^{16}$ preferably represents a propylene or hydroxypropylene group having 3 carbon atoms. On the other hand, in the case of the carbobetaine, $R^{16}$ preferably represents an alkylene group having 1 to 5 carbon atoms. In particular, in the case of the carbobetaine, one wherein D and E may represent a

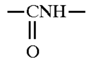 group and a propylene group (a=b=1), respectively can be used.

The bleach activator (c) to be used in the present invention, which yields an organic peracid when reacted with hydrogen peroxide, is not particularly limited so far as it can be solubilized by a surfactant used for the preparation of the liquid bleaching agent composition of the present invention, and examples thereof include triacetin, a fatty acid anhydride having 2 to 18 carbon atoms, and sodium alkanoyloxybenzenesulfonate.

Particularly preferred examples of the bleach activator include compounds represented by the following general formula (I), including compounds capable of yielding an organic peracid having a quaternary ammonium group:

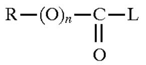

(I)

wherein R represents an alkyl, alkenyl, aryl or alkylsubstituted aryl group which may have a

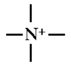 group, n is 0 or 1, and L represents an eliminable group having an anionic group.

In the general formula (I), the total number of carbon atoms in the R is preferably 1 to about 20.

Examples of the L include

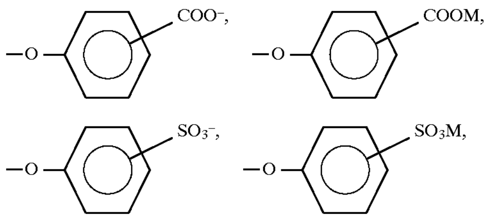

$—O—R^{17}—(O)_p—SO_3^-O$ and $—O—R^{17}—(O)_p—SO_3M$ (wherein $R^{17}$ represents an alkylene group, p is 0 or 1 and M represents H or an alkali metal). The alkylene group $R^{17}$ preferably has 1 to 5 carbon atoms.

Preferred examples of the bleach activator include also compounds represented by the following general formula (II):

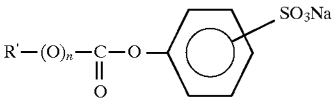 (II)

wherein R' represents an alkyl, alkenyl, aryl or alkylsubstituted aryl group having 1 to 20 carbon atoms in total and n is 0 or 1.

Still preferred examples of the bleach activator include one capable of yielding an organic peracid having a quaternary ammonium group, and specific examples thereof include compounds represented by the following general formula (III):

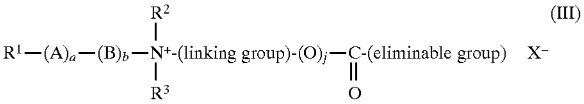 (III)

A description will now be made on the general formula (III).

$R^1$ represents an alkyl group having 1 to 18 carbon atoms, preferably 1 to 14 carbon atoms, A represents

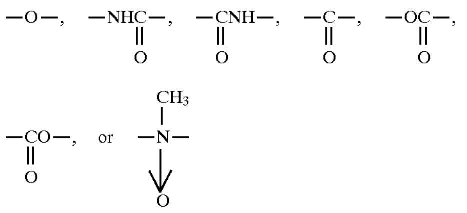

and B represents $—(CH_2)_n—$, $—(OCH_2CH_2)_n—$ or

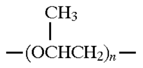

(wherein n is 1 to 12, particularly preferably 1 to 5).

a and b are either both 0 or both 1, and j is 1 or 0. $R^2$ and $R^3$, which may be the same or different from each other, represent an alkyl group having 1 or 2 carbon atoms.

The linking group is a divalent group and not particularly limited, and examples thereof include a straight-chain or branched alkylene group, a cyclo-alkylene group, a phenylene group, an alkylene-phenylene group and an oxyalkylene group ($—CH_2CH_2O—$).

Although examples of the eliminable group include the following groups, it is not limited to these examples only:

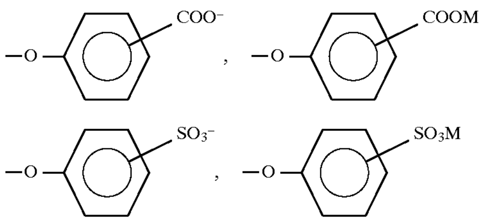

$—O—R^{17}—(O)_p—SO_3^-O$ and $—O—R^{17}—(O)_p—SO_3M$ (wherein $R^{17}$ represents an alkylene group, preferably an alkylene group having 1 to 5 carbon atoms, p is 0 or 1 and M represents H or an alkali metal).

In the general formula (III), $X^-$ represents an inorganic or organic counter ion. However, $X^-$ is absent when the eliminable group is

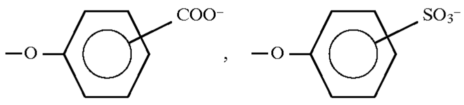 or $—O—R^{17}—(O)_p—SO_3^-$.

Specific examples of the compound represented by the general formula (III) include the following compounds.

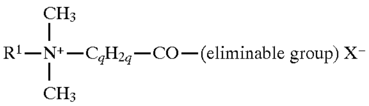 (III-1)

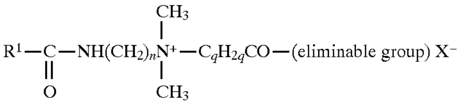 (III-2)

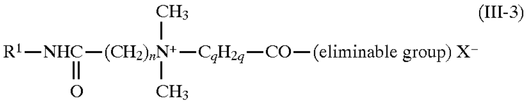 (III-3)

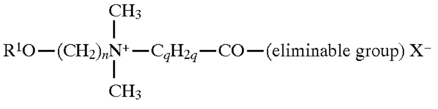 (III-4)

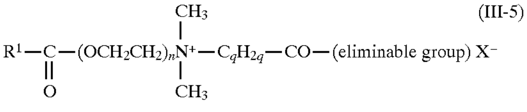 (III-5)

In the present invention, the surfactant (b) and the bleach activator (c), which yields an organic peracid when reacted with hydrogen peroxide, are incorporated in a total amount ((b) plus (c)) of 0.1 to 50% by weight, preferably 6 to 45% by weight, particularly preferably 8 to 25% by weight, into the liquid bleaching agent composition. The weight ratio of the component (b) to the component (c) is 50/1 to 1/5, preferably 15/1 to 1/1, particularly preferably 10/1 to 3/1.

Further, in the present invention, the surfactant (b) and the bleach activator (c), which yields an organic peracid when reacted with hydrogen peroxide, are selected in such a manner that the value of the interaction parameter β of a mixed system consisting of the surfactant (b) and the bleach activator (c) as calculated according to the following equation is smaller than −2, preferably −30 to −3, particularly preferably −20 to −4:

$$\beta = \frac{In[\alpha_1 C^*/(x_1 C_1)]}{(1-x_1)^2} = \frac{In[\alpha_2 C^*/(x_2 C_2)]}{(1-x_2)^2}$$

wherein $C_1$: the critical micelle concentration of the surfactant;

$C_2$: the critical micelle concentration of the bleach activator;

$\alpha_1$: the molar fraction of the surfactant in the whole mixed solute (molar fraction of added surfactant);

$\alpha_2$: the molar fraction of the bleach activator in the whole mixed solute (molar fraction of added activator);

C*: the critical micelle concentration of the mixed system;

$X_1$: the molar fraction of the surfactant in the mixed micelle; and $X_2$: the molar fraction of the bleach activator in the mixed micelle.

When the bleach activator (c) and the surfactant (b) are selected in such a combination that the β value is smaller than −2, it becomes possible to produce a transparent liquid oxygen-base bleaching composition wherein the bleach activator (c) is in a very stabilized state in the aqueous hydrogen peroxide solution.

For this reason, in the present invention, it is important to select the surfactant (b) and the bleach activator (c) in such a combination that the β value is smaller than −2.

Specific examples of such a combination include:

(1) a combination of at least one surfactant selected from sulfobetaines among the compounds represented by the above-mentioned general formula (B) with at least one bleach activator represented by the above-mentioned general formulas (II) or (III);

(2) a combination of at least one surfactant selected from carbobetaines among the compounds represented by the above-mentioned general formula (B) with at least one bleach activator represented by the above-mentioned general formulas (II) or (III);

(3) a combination of at least one surfactant selected from amine oxides represented by the above-mentioned general formula (A) with at least one bleach activator represented by the above-mentioned general formulas (II) or (III); and (4) a combination of polyoxyethylene alkyl ethers (average number of moles of added ethylene oxide: 5 to 20) with at least one bleach activator represented by the above-mentioned general formulas (II) or (III). In particular, when the combination (1) is selected, it becomes possible to produce a liquid oxygen-base bleaching agent composition which is stable for a long period of time.

The method of measuring the interaction parameter β will now be described.

It is known that the value of the interaction parameter β does not depend upon the relative molar ratio such as the molar fractions ($X_1$, $X_2$) of the surfactant and bleach activator in the mixed micelle and the molar fractions ($\alpha_1$, $\alpha_2$) of the surfactant and bleach activator in the whole mixed solute but is uniquely determined by the kind and combination of the surfactant and bleach activator used. Therefore, an aqueous mixed solution comprising equimolar amounts of the surfactant and the bleach activator is selected in the measurement of the β value.

At the outset, the surface tension of an aqueous solution of a surfactant alone, an aqueous solution of a bleach activator alone and a mixed solution comprising equimolar amounts of a surfactant and a bleach activator ($\alpha_1=\alpha_2=0.5$) with the concentration being varied are measured, and $C_1$, that is, the critical micelle concentration of the aqueous solution of a surfactant alone, $C_2$, that is, the critical micelle concentration of the aqueous solution of a bleach activator alone and C*, that is, the critical micelle concentration of the mixed solution of a surfactant and a bleach activator are determined from the concentration-surface tension curve.

Next, the parameter of interaction (β) between the surfactant and the bleach activator is determined from the above $\alpha_1$, $C_1$ and C* as a function of the molar fraction $X_1$, an unknown quantity, of the surfactant in the mixed micelle.

The parameter of interaction (β) between the surfactant and the bleach activator is similarly determined from the above $\alpha_2$, $C_2$ and C* as a function of the molar fraction $X_2$, an unknown quantity, of the bleach activator in the mixed micelle.

The results are represented as follows:

$$\beta = \frac{In[0.5C^*/(x_1 C_1)]}{(1-x_1)^2} = \frac{In[0.5C^*/(x_2 C_2)]}{(1-x_2)^2}$$

In this equation, since $x_1+x_2=1$, the respective molar fractions $x_1$ and $x_2$ of the surfactant and the bleach activator in the mixed micelle can be determined, whereby the parameter of interaction (β) between the surfactant and the bleach activator can be determined.

The measurement of the interaction parameter β can be extended to a multi-component system comprising three or more components. For example, in the case of a ternary system comprising surfactants $A_1$ and $A_2$ and a bleach activator, the interaction parameter β can be determined by regarding the mixture of surfactants $A_1$ and $A_2$ as one surfactant and determining the critical micelle concentration of the surfactant and that of the bleach activator. This is also true of the case where the bleaching agent comprises a multi-component system or the surfactant and the bleach activator each comprise a multi-component system.

The present inventors have studied on the relationship between the interaction parameter β and the stability of the liquid bleaching agent composition with respect to a system where various surfactants and bleach agents are present together and, as a result, have found that a transparent liquid oxygen-base bleaching agent composition, wherein a bleach activator is in a very stable state in an aqueous hydrogen peroxide solution, can be produced only when a combination of the bleach activator with the surfactant is selected in such a manner that the β value is smaller than −2.

Specifically, in the bleaching agent composition of the present invention, the solubilization of the bleach activator in a micelle of the surfactant serves to prevent the occurrence of a reaction of the bleach activator with a bulk solution and contributes to the stabilization of the bleach activator. Examples of the system wherein the bleach activator can be more stabilized include a system wherein the rate of exchange of the bleach activator in the micelle with one in a monodisperse state in the bulk solution is lower, a system wherein the probability of the presence of the bleach activator in the micelle is higher, and a system wherein the bleach activator is less liable to react with hydrogen peroxide in the bulk. Specifically, it is conceivable that the bleaching agent composition has a good storage stability in a system wherein the bleach activator difficultly migrates from the mixed micelle to the bulk. It is conceivable that when the bleaching agent composition is diluted during washing or bleaching, the mixed micelle is broken, thus inducing an intended reaction for yielding an organic peracid.

If necessary, a chelating agent (d) can be incorporated into the liquid bleaching agent composition of the present invention. Examples of the chelating agent (d) to be used in the present invention include scavengers for a divalent metal ion, for example, the following compounds:

(1) an alkali metal salt or an alkanolamine salt of a phosphoric compound such as orthophosphoric acid, pyrophosphoric acid, tripolyphosphoric acid, metaphosphoric acid, hexametaphosphoric acid and phytic acid;

(2) an alkali metal salt or an alkanolamine salt of a phosphonic acid such as ethane-1,1-diphosphonic acid, ethane-1,1,2-triphosphonic acid, ethane-1-hydroxy-1,1-diphosphonic acid and its derivative, ethanehydroxy-1,1,2-triphosphonic acid, ethane-1,2-dicarboxy-1,2-diphosphonic acid and methanehydroxy-phosphonic acid;

(3) an alkali metal salt or an alkanolamine salt of a phosphono carboxylic acid such as 2-phosphonobutane-1,2-dicarboxylic acid, 1-phosphonobutane-2,3,4-tricarboxylic acid and α-methylphosphonosuccinic acid;

(4) an alkali metal salt or an alkanolamine salt of an amino acid such as aspartic acid, glutamic acid and glycine;

(5) an alkali metal salt or an alkanolamine salt of an aminopolyacetic acid such as nitrilotriacetic acid, iminodiacetic acid, ethylenediaminetetraacetic acid, diethylenetriaminepentaacetic acid, glycoletherdiaminetetraacetic acid, hydroxyethyliminodiacetic acid, triethylenetetraminehexaacetic acid and djenkolic acid;

(6) an alkali metal salt or an alkanolamine salt of an organic acid such as diglycolic acid, oxydisuccinic acid, carboxymethyloxysuccinic acid, citric acid, lactic acid, tartaric acid, oxalic acid, malic acid, oxydisuccinic acid, gluconic acid, carboxymethylsuccinic acid and carboxymethyltartaric acid;

(7) an alkali metal salt or an alkanolamine salt of aluminosilicic acid represented by zeolite A; and (8) an aminopoly(methylenephosphonic acid) and an alkali metal salt or an alkanolamine salt thereof, and polyethylenepolyaminepoly(methylenephosphonic acid) and an alkali metal salt or an alkanolamine salt thereof.

The chelating agent (d) enhances the bleaching detergency of the bleaching agent composition and, at the same time, can improve the storage stability. For this reason, the amount of incorporation of the chelating agent in the composition is preferably 0.0005 to 5% by weight, particularly preferably 0.01 to 1% by weight.

The liquid bleaching agent composition of the present invention usually contains the above components (a) to (c) or the above components (a) to (d), and water. The pH value of the composition is preferably in a neutral range, or in weakly acidic to acidic range (pH 6 or less, preferably 3.5 or less). If necessary, besides the above components, pH regulators, dispersants, thickeners, perfumes, dyes, fluorescent dyes and enzymes, such as protease, lipase, amylase and cellulase, may be incorporated into the liquid bleaching agent composition of the present invention.

In the liquid bleaching agent composition of the present invention, since the bleach activator and the surfactant are used in such a combination as will provide a specified interaction parameter β value, the formation of a mixed micelle comprising the two components serves to stabilize the bleach activator. The bleach activator is dissolved in a homogeneous and transparent state in an aqueous solution of hydrogen peroxide by the formation of the above-described mixed micelle. This provides a transparent liquid oxygen-base bleaching agent composition wherein a bleach activator is in a very stabilized state in an aqueous solution of hydrogen peroxide.

EXAMPLES

The present invention will now be described with reference to the following Examples, though it is not limited to these Examples only.

Example 1

Various liquid bleaching agent compositions listed in Table 1 were prepared through the use of the following surfactants (A-1 to A-3), bleach activators (B-1 to B-3) and chelating agent (C-1) and then examined for the storage stability, bleaching effect immediately after preparation and after storage for 14 days, and the occurrence of phase separation and turbidity. Further, the β values were determined on the bleaching compositions. The pH value of each composition was adjusted to 2 with sulfuric acid. The evaluation was conducted by the following method. The results are given in Table 1.

A-1; 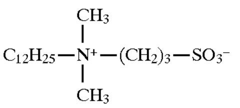

A-2; $C_{12}H_{25}OSO_3Na$

A-3; $C_{12}H_{25}O-(CH_2CH_2O)_{10}-H$

B-1; 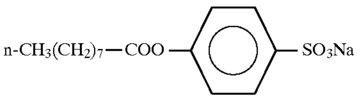

B-2; 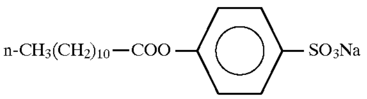

B-3; 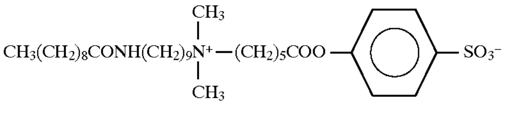

C-1; 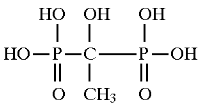

(1) Method of evaluating bleaching effect 9.3 ml of each of the liquid bleaching agent composition comprising components specified in Table 1 was thrown into small washing machine (National Mini Mini; amount of liquid: 7 l) containing a commercially available detergent solution (0.133 wt. %, pH: 10.2). Five clothes stained with black tea* and prepared by the following method was placed in the washing machine, washed for 15 min, rinsed with tap water and dried to calculate the percentage bleaching according to the following equation. The reflectance was determined with a colorimetric color-difference meter N-DR 101-DP manufactured by Nippon Denshoku Co., Ltd. In this test, use was made of a liquid bleaching agent composition immediately after the preparation and a liquid bleaching agent composition after storage in a thermohygrostatted room at 40° C. and 80% RH for 14 days.

$$\text{Percentage bleaching (\%)} = \frac{\text{reflectance after bleaching} - \text{reflectance before bleaching}}{\text{reflectance of white cloth} - \text{reflectance before bleaching}} \times 100$$

*: preparation of cloth stained with black tea 80 g of Nitto black tea (yellow package) was boiled in 3 l of deionized water for about 15 min and filtered through a previously desized bleached cotton. A cotton shirting #2003 cloth was immersed in the filtrate and boiled for about 15 min. The container containing the black tea and the cotton shirting was removed away from the heat source and allowed to stand for 2 hrs. The cotton shirting was spontaneously dried, washed with water until the washing had no color, dehydrated and pressed. The pressed cloth was cut into a test piece having a size of 8×8 cm and applied to the experiment.

(2) Method of evaluating storage stability

A sample was placed in a transparent glass container, stored in a thermohygrostatted room at 40° C. and 80% RH for 14 days. The amount of the bleach activator, which yields an organic peracid and is contained in the sample, was measured before and after the storage, and the residual rate of the effective bleach activator was calculated according to the following equation:

$$\text{residual rate of effective bleach activator (\%)} = \frac{\text{amount of effective bleach activator after storage}}{\text{amount of effective bleach activator before storage}} \times 100$$

(3) Method of evaluating occurrence of phase separation and turbidity

The sample after storage in the above item (2) was allowed to stand at room temperature for 7 days and then evaluated for the occurrence of phase separation and turbidity of the liquid bleaching composition according to the following criteria:

○: the whole solution was homogeneous.

x : precipitation occurred or the solution was turbid.

(4) Method of determining β value

The surface tensions of a solution of a surfactant (group A in Table 1) alone, a solution of a bleach activator (group B in table 1) alone, and an aqueous mixed solution comprising equimolar amounts of the surfactant and the bleach activator were measured in various concentrations at 25° C. The cmc values of the aqueous solution of a single component and the aqueous mixed solution were determined from the surface tension-concentration curve thus obtained. Then, the interaction parameter β was determined according to the following equation:

$$\beta = \frac{\ln[0.5C^*/(x_1C_1)]}{(1-x_1)^2} = \frac{\ln[0.5C^*/(x_2C_2)]}{(1-x_2)^2}$$

The surface tension of each solution was measured with a Surface Tensiometer CBVP-A3 manufactured by Kyowa Interface Science Co., Ltd.

TABLE 1

| | | | Invention product | | | | | Comparative product | | | | |
|---|---|---|---|---|---|---|---|---|---|---|---|---|
| | | | 1 | 2 | 3 | 4 | 5 | 1 | 2 | 3 | 4 | 5 |
| Component | $H_2O_2$ | | 5 | 5 | 5 | 5 | 5 | 5 | 5 | 5 | 5 | 5 |
| (wt. %) | group A | A-1 | 10 | 10 | 10 | | | 10 | | | | |
| | | A-2 | | | | 10 | | | | | | 10 |
| | | A-3 | | | | | 20 | | | | | |
| | group B | B-1 | 2 | | | | | | 2 | | | 2 |
| | | B-2 | | 2 | | | 2 | | | 2 | | |
| | | B-3 | | | 2 | 2 | | | | | 2 | |
| | C-1 | | 0.1 | 0.1 | 0.1 | 0.1 | | 0.1 | 0.1 | 0.1 | 0.1 | 0.1 |
| | water | | 82.9 | 82.9 | 82.9 | 82.9 | 73.0 | 84.9 | 92.9 | 92.9 | 92.9 | 82.9 |
| State | | | transparent liquid | transparent liquid | transparent liquid | transparent liquid | transparent liquid | transparent liquid | transparent liquid | suspension | suspension | transparent liquid |
| Interaction parameter β | | | −6.6 | −5.2 | −4.3 | −4.9 | −3.9 | —* | —* | —* | —* | −1.3 |
| Percentage bleaching | immediately after preparation | | 9.1 | 9.2 | 13.2 | 12.5 | 10.0 | 3.9 | 8.6 | 7.0 | 10.2 | 11.3 |
| (%) | after storage for 14 days | | 9.0 | 9.2 | 12.2 | 12.0 | 8.8 | 3.8 | 3.2 | 3.7 | 5.2 | 4.0 |
| Storage stability (%) | | | 79 | 87 | 70 | 64 | 42 | — | 0 | 10 | 35 | 0 |
| Phase separation and turbidity | | | ○ | ○ | ○ | ○ | ○ | ○ | x | x | x | x |

(Note)
*: because the composition contains only either the surfactant (group A) or the bleach activator (group B).

EXAMPLE 2

Various liquid bleaching agent compositions listed in Tables 2 and 3 were prepared through the use of the bleach activator (B-1 to B-3) used in Example 1, the following bleach activators (B-4 to B-6), the following surfactants (A-4 to A-8) and the following chelating agent (C-2) and then examined for the storage stability, the bleaching effect immediately after preparation and after storage for 14 days, and the occurrence of phase separation and turbidity in the same manner as that of Example 1. The pH value of each composition was adjusted to 2 with sulfuric acid. The results are given in Tables 2 and 3.

A-4; 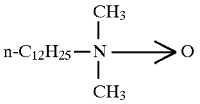

A-5; 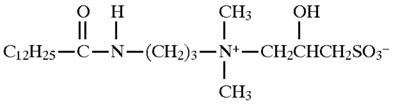

A-6; 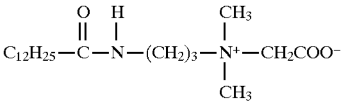

A-7; a mixture comprising equal amounts (weight ratio) of

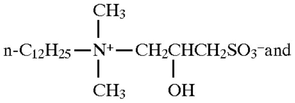

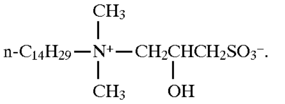

-continued

A-8; a mixture comprising equal amounts (weight ratio) of $n\text{-}C_{12}H_{25}-O-(CH_2CH_2O)_{10}-H$ and $n\text{-}C_{13}H_{27}-O-(CH_2CH_2O)_{10}-H$.

B-4; 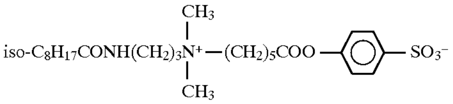

B-5; 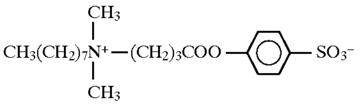

B-6; a mixsture comprising equal amounts (weight ratio) of

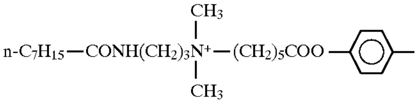 and

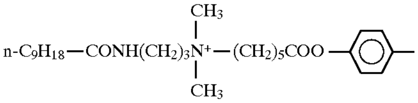

C-2; 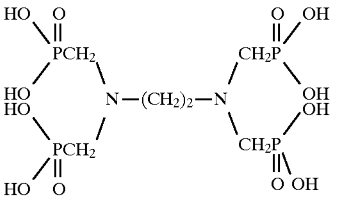

TABLE 2

| | | Invention product | | | | | Comparative product | | |
|---|---|---|---|---|---|---|---|---|---|
| | | 6 | 7 | 8 | 9 | 10 | 6 | 7 | 8 |
| Component (wt. %) | $H_2O_2$ | 5 | 5 | 5 | 5 | 5 | 5 | 5 | 5 |
| | A-4 | 5 | 5 | 5 | 5 | 5 | 5 | | |
| | B-1 | 1 | | | | | | 1 | |
| | B-2 | | 1 | | | | | | |
| | B-3 | | | 1 | | | | | |
| | B-4 | | | | | 1 | | | |
| | B-5 | | | | 1 | | | | 1 |
| | water | 89 | 89 | 89 | 89 | 89 | 90 | 94 | 94 |
| State | | trans-parent liquid | trans-parent liquid | trans-parent liquid | trans-parent liquid | trans-parent liquid | trans-parent liquid | trans-parent liquid | suspen-sion |
| Interaction parameter β | | −4.0 | −2.8 | −2.7 | −2.4 | −2.6 | —* | —* | —* |
| Percentage bleaching (%) | immediately after preparation | 9.0 | 9.1 | 12.7 | 14.4 | 12.4 | 4.5 | 8.1 | 12.4 |
| | after storage for 14 days | 8.5 | 8.4 | 9.1 | 9.7 | 7.2 | 4.0 | 3.5 | 6.7 |
| Storage stability (%) | | 52.3 | 45.5 | 37.7 | 28.9 | 20.1 | 0.0 | 0.0 | 11.0 |
| Phase separation and turbidity | | ○ | ○ | ○ | ○ | ○ | ○ | x | x |

(Note)
*: because the composition contains only either the surfactant (group A) or the bleach activator (group B).

TABLE 3

| | | | Invention product | | | | |
|---|---|---|---|---|---|---|---|
| | | | 11 | 12 | 13 | 14 | 15 |
| Component | $H_2O_2$ | | 5 | 5 | 5 | 5 | 5 |
| (wt. %) | group A | A-5 | 10 | | | | 10 |
| | | A-6 | | 10 | | | |
| | | A-7 | | | 10 | | |
| | | A-8 | | | | 20 | |
| | group B | B-1 | 2 | | 2 | | |
| | | B-2 | | 2 | | 2 | |
| | | B-6 | | | | | 2 |
| | C-2 | | 0.1 | 0.1 | 0.1 | | |
| | water | | 82.9 | 82.9 | 82.9 | 73.0 | 83.0 |
| State | | | transparent liquid | transparent liquid | transparent liquid | transparent liquid | transparent liquid |
| Interaction parameter β | | | −7.2 | −5.1 | −7.3 | −2.9 | −3.8 |
| Percentage bleaching (%) | immediately after preparation | | 9.2 | 9.1 | 9.3 | 9.9 | 12.7 |
| | after storage for 14 days | | 9.2 | 9.0 | 9.2 | 8.4 | 9.3 |
| Storage stability (%) | | | 81 | 64 | 80 | 43 | 41 |
| Phrase separation and turbidity | | | ○ | ○ | ○ | ○ | ○ |

We claim:

1. A transparent liquid bleaching agent composition comprising hydrogen peroxide (a); a surfactant (b); and a bleach activator (c) capable of yielding an organic peracid when reacted with hydrogen peroxide and having a value of an interaction parameter β of a mixed system consisting of the surfactant (b) and the bleach activator (c) solubilized by surfactant (b), being calculated according to the following equation of smaller than −2:

$$\beta = \frac{In[\alpha_1 C^*/(x_1 C_1)]}{(1-x_1)^2} = \frac{In[\alpha_2 C^*/(x_2 C_2)]}{(1-x_2)^2}$$

wherein $C_1$: the critical micelle concentration of the surfactant;

$C_2$: the critical micelle concentration of the bleach activator;

$\alpha_1$: the molar fraction of the surfactant in the whole mixed solute (molar fraction of added surfactant);

$\alpha_2$: the molar fraction of the bleach activator in the whole mixed solute (molar fraction of added activator);

$C^*$: the critical micelle concentration of the mixed system;

$X_1$: the molar fraction of the surfactant in the mixed micelle; and $X_2$: the molar fraction of the bleach activator in the mixed micelle.

2. The liquid bleaching agent composition according to claim 1, which further contains a chelating agent (d).

3. The liquid bleaching agent composition according to claim 1, wherein the surfactant (b) is at least one member selected from the group consisting of nonionic surfactants, anionic surfactants and amphoteric surfactants.

4. The liquid bleaching agent composition according to claim 3, wherein the surfactant (b) comprises a sulfobetaine amphoteric surfactant.

5. The liquid bleaching agent composition according to claim 1, wherein the surfactant (b) is at least one member selected from the group consisting of nonionic surfactants and amphoteric surfactants.

6. The liquid bleaching agent composition according to claim 5, wherein the surfactant (b) comprises a sulfobetaine amphoteric surfactant.

7. The liquid bleaching agent composition according to claim 1, wherein the bleach activator (c) is at least one member selected from the group consisting of compounds represented by the following general formula (I):

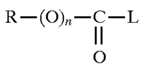 (I)

wherein R represents an alkyl, alkenyl, aryl or alkyl-substituted aryl group which may have an

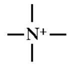 group, n is 0 or 1, and L represents an eliminable group having an anionic group.

8. The liquid bleaching agent composition according to claim 7, wherein L is selected from the group consisting of

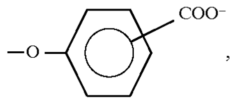 , 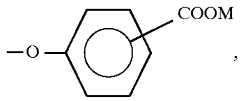 ,

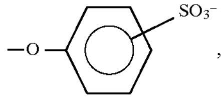 , 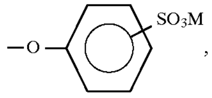 , $—O—R^{17}—(O)_p—SO_3^-$ and $—O—R^{17}—(O)_p—SO_3M$ wherein $R^{17}$ represents an alkylene group having 1 to 5 carbon atoms; p is 0 or 1; and M represents H or an alkali metal.

9. The liquid bleaching agent composition according to claim 7, wherein said bleach activator is represented by the following formula

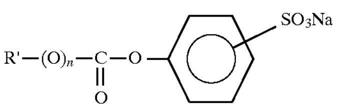

wherein R' represents an alkyl, alkenyl, aryl or alkylsubstituted aryl group having 1 to 20 carbon atoms; and n is 0 or 1.

10. The liquid bleaching agent composition according to claim 7, wherein said bleach activator is capable of yielding an organic peracid having a quaternary ammonium group.

11. The liquid bleaching agent composition according to claim 7, wherein said bleach activator has the formula

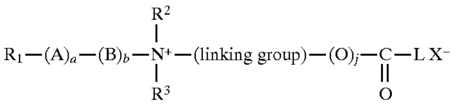

wherein $R^1$ represents an alkyl group having 1 to 18 carbon atoms;

A represents

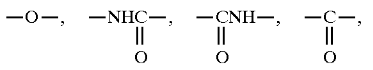

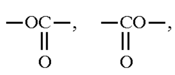 or 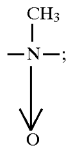

B represents $-(CH_2)_n-$, $-(OCH_2CH_2)_n-$ or

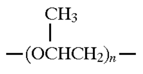

wherein n is 1 to 12;

a and b are either both 0 or both 1; j is 1 or 0;

$R^2$ and $R^3$, which may be the same or different from each other, represent an alkyl group having 1 or 2 carbon atoms; linking group is a divalent group; X represents an inorganic or organic counter ion; and L is an eliminating group.

12. The liquid bleaching agent composition according to claim 11, wherein said linking group is a straight-chain or branched alkylene group, a cycloalkylene group, a phenylene group, an alkylene-phenylene group or an oxyalkylene group.

13. The liquid bleaching agent composition according to claim 12, wherein L is selected from the group consisting of

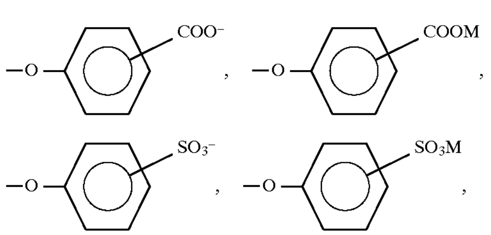

$-O-R^{17}-(O)_p-SO_3^-$ and $-O-R^{17}-(O)_p-SO_3M$ wherein $R^{17}$ represents an alkylene group having 1 to 5 carbon atoms; p is 0 or 1; and M represents H or an alkali metal.

14. A transparent liquid bleaching agent composition, said composition comprises hydrogen peroxide (a), a surfactant (b) and a bleach activator (c) capable of yielding an organic peracid when reacted with hydrogen peroxide, the content of the hydrogen peroxide (a) is 0.3 to 30% by weight based on the total amount of the composition, the total content of the surfactant (b) and the bleach activator (c) is 0.1 to 50% by weight based on the total amount of the composition, the weight ratio of the surfactant (b) to the bleach activator (c) is 50/1 to 1/5, and the interaction parameter β of a mixed system consisting of the surfactant (b) and the bleach activator (c) solublized by surfactant (b), being calculated according to the following equation is smaller than −2:

$$\beta = \frac{In[\alpha_1 C^*/(x_1 C_1)]}{(1-x_1)^2} = \frac{In[\alpha_2 C^*/(x_2 C_2)]}{(1-x_2)^2}$$

wherein $C_1$: the critical micelle concentration of the surfactant;

$C_2$: the critical micelle concentration of the bleach activator;

$\alpha_1$: the molar fraction of the surfactant in the whole mixed solute (molar fraction of added surfactant);

$\alpha_2$: the molar fraction of the bleach activator in the whole mixed solute (molar fraction of added activator);

$C^*$: the critical micelle concentration of the mixed system;

$X_1$: the molar fraction of the surfactant in the mixed micelle; and $X_2$: the molar fraction of the bleach activator in the mixed micelle.

15. The liquid bleaching agent composition according to claim 14, wherein the surfactant (b) is at least one member selected from the group consisting of nonionic surfactants, anionic surfactants and amphoteric surfactants.

16. The liquid bleaching agent composition according to claim 15, wherein the surfactant (b) comprises a sulfobetaine amphoteric surfactant.

17. The liquid bleaching agent composition according to claim 14, wherein the surfactant (b) is at least one member selected from the group consisting of nonionic surfactants and amphoteric surfactants.

18. The liquid bleaching agent composition according to claim 17, wherein the surfactant (b) comprises a sulfobetaine amphoteric surfactant.

19. A transparent liquid bleaching agent composition comprising hydrogen peroxide (a); a surfactant (b); and a bleach activator (c) capable of yielding an organic peracid when reacted with hydrogen peroxide and having β interaction parameter value of a mixed system consisting of the surfactant (b) and the bleach activator (c) solubilized by surfactant (b), being calculated according to the following equation of smaller than −2:

$$\beta = \frac{In[\alpha_1 C^*/(x_1 C_1)]}{(1-x_1)^2} = \frac{In[\alpha_2 C^*/(x_2 C_2)]}{(1-x_2)^2}$$

wherein $C_1$: the critical micelle concentration of the surfactant;

$C_2$: the critical micelle concentration of the bleach activator;

$\alpha_1$: the molar fraction of the surfactant in the whole mixed solute (molar fraction of added surfactant);

$\alpha_2$: the molar fraction of the bleach activator in the whole mixed solute (molar fraction of added activator);

C*: the critical micelle concentration of the mixed system;

$X_1$: the molar fraction of the surfactant in the mixed micelle; and $X_2$: the molar fraction of the bleach activator in the mixed micelle, said composition having a pH of 6 or less.

* * * * *